United States Patent
Gosselin (10) Patent No.: US 11,077,547 B2
(45) Date of Patent: Aug. 3, 2021

(54) PARALLEL MECHANISM WITH KINEMATICALLY REDUNDANT ACTUATION

(71) Applicant: UNIVERSITE LAVAL, Quebec (CA)

(72) Inventor: Clement Gosselin, Quebec (CA)

(73) Assignee: UNIVERSITE LAVAL, Quebec (CA)

( * ) Notice: Subject to any disclaimer, the term of this patent is extended or adjusted under 35 U.S.C. 154(b) by 0 days.

(21) Appl. No.: 15/309,582

(22) PCT Filed: May 8, 2015

(86) PCT No.: PCT/CA2015/050410
§ 371 (c)(1),
(2) Date: Nov. 8, 2016

(87) PCT Pub. No.: WO2015/168799
PCT Pub. Date: Nov. 12, 2015

(65) Prior Publication Data
US 2017/0221376 A1    Aug. 3, 2017

Related U.S. Application Data

(60) Provisional application No. 61/990,397, filed on May 8, 2014.

(51) Int. Cl.
*B25J 9/00* (2006.01)
*F16M 11/12* (2006.01)
(Continued)

(52) U.S. Cl.
CPC .......... *B25J 9/0072* (2013.01); *B25J 9/0066* (2013.01); *B25J 9/1623* (2013.01);
(Continued)

(58) Field of Classification Search
CPC ... B25J 9/00; B25J 9/003; B25J 9/0045; B25J 9/0051; B25J 9/0054; B25J 9/0057;
(Continued)

(56) References Cited

U.S. PATENT DOCUMENTS 4,976,582 A    12/1990  Clavel
5,219,266 A  *  6/1993  Reboulet ............. B25J 17/0266
414/733
(Continued)

FOREIGN PATENT DOCUMENTS

EP    0993918 A2  *  4/2000  ............ B25J 9/0072
GB    2083795 A  *  3/1982  ............ B25J 9/0069
(Continued)

OTHER PUBLICATIONS

SU 1757867 A1 Spacial Mechanism, (Viktor Glazunov) Aug. 30, 1992, [database online], [retrieved Oct. 25, 2018] Retrieved from ProQuest <URL: https://dialog.proquest.com/professional/patents/docview/1138170721/166112EF86B6948BCD2/2?accountid=161361)> (Year: 1992).*

*Primary Examiner* — Joseph Brown
(74) *Attorney, Agent, or Firm* — Norton Rose Fulbright Canada LLP (57) ABSTRACT

A parallel mechanism comprises legs with kinematically redundant actuation for a parallel mechanism. Each of these legs comprises a first sub-leg and a second sub-leg each with a proximal end and a distal end. A link has a proximal end and a distal end. A joint with a rotational degree of freedom (DOF) is between and common to the distal ends of the sub-legs, and the proximal end of the link. A joint provides two or more rotational DOFs at the distal end of the link and connects the distal end of the link to one end of the parallel mechanism. Joints in the sub-legs provide DOFs to the sub-legs and connect the proximal ends of the sub-legs to the other end of the parallel mechanism. A degree of actuation (DOA) is provided for each of the sub-legs to control movement of the link.

11 Claims, 6 Drawing Sheets

(51) Int. Cl.
*F16M 11/18* (2006.01)
*B25J 17/02* (2006.01)
*B25J 9/16* (2006.01)
*G09B 9/14* (2006.01)

(52) U.S. Cl.
CPC ....... *B25J 17/0216* (2013.01); *B25J 17/0266* (2013.01); *F16M 11/121* (2013.01); *F16M 11/18* (2013.01); *G09B 9/14* (2013.01)

(58) Field of Classification Search
CPC ........ B25J 9/006; B25J 9/0063; B25J 9/0066; B25J 9/0069; B25J 9/0072; B25J 17/0216; B25J 17/0266; B25J 9/1623; F16M 11/18; F16M 11/121; F16M 11/12; B09B 9/08; B09B 9/12; B09B 9/14; B23Q 1/5462; B23Q 1/4838
USPC .......................................................... 434/55
See application file for complete search history.

(56) References Cited

U.S. PATENT DOCUMENTS

| | | | | |
|---|---|---|---|---|
| 5,740,699 | A | * | 4/1998 | Ballantyne ............. B25J 9/0069 74/490.03 |
| 6,047,610 | A | | 4/2000 | Stocco et al. |
| 2008/0202274 | A1 | * | 8/2008 | Stuart ................... B25J 9/0072 74/490.02 |
| 2010/0275718 | A1 | * | 11/2010 | Stuart ................... B25J 9/0072 74/490.01 |
| 2013/0142608 | A1 | | 6/2013 | Zhang et al. |

FOREIGN PATENT DOCUMENTS

| | | | | |
|---|---|---|---|---|
| GB | 2086980 | A * | 5/1982 | ............. B25J 9/006 |
| GB | 2088987 | A * | 6/1982 | ............. B25J 9/006 |
| IN | 3277/CHE/2012 | | 2/2014 | |
| SU | 1757867 | A1 * | 8/1992 | ............ B25J 9/0072 |

* cited by examiner

PARALLEL MECHANISM WITH KINEMATICALLY REDUNDANT ACTUATION

CROSS-REFERENCE TO RELATED APPLICATION

The present application claims the priority of U.S. Provisional Patent Application Ser. No. 61/990,397, filed on May 8, 2014, the contents of which are incorporated herein by reference.

TECHNICAL FIELD

The present disclosure is in the field of parallel mechanisms, robotic mechanisms, motion simulation systems, flight simulation motion platforms and motion platforms for entertainment applications.

BACKGROUND OF THE ART

One of the major problems with parallel mechanisms is their limited range of motion, especially their limited rotational range of motion. In flight simulation applications, for instance, the required payload of the platform is very large and the kinematic structure of the mechanism must then be such that critical links are subjected to only tension/compression forces. The types of kinematic structures with such characteristics are limited and generally have limited rotational ranges of motion. Moreover, considering a particular parallel mechanism, the translational range of motion can always be made larger by scaling up the mechanism. However, a scale up has no effect on the rotational range of motion, which is often limited by kinematic singularities.

Thus, in general, six-degree-of-freedom flight simulators are built according to the so-called Gough-Stewart platform disclosed in U.S. Pat. No. 3,295,224 (granted to K. L. Cappel on Jan. 3, 1967) and in U.S. Pat. No. 4,753,596 (granted to J. W. Hart et al. on Jun. 28, 1988). Such motion platforms are widely used for the simulation of civil and military aircraft and helicopter in particular for the training of pilots.

One of the approaches to increase the rotational range of motion is to include links that are subjected to bending, such as in the invention disclosed in U.S. Pat. No. 5,791,903 (granted to R. L. Brown et al. on Aug. 11, 1998) and in U.S. Pat. No. 6,902,402 (granted to F. McClintic on Jun. 7, 2005). However, this approach is applicable only to limited payloads and cannot be applied to full flight simulators or other situations with large payloads.

For applications in robotics and haptics, the rotational range of motion can be increased by using so-called hybrid architectures, which are not completely parallel. An example of such a device is the invention disclosed in U.S. Pat. No. 6,047,610 (granted to S. E. Salcudean and L. J. Stocco on Apr. 11, 2000). However, this type of mechanism cannot be used for large payloads. Also, the rotational range of motion may still be limited by kinematic singularities, at least for some of the rotational motions.

Another approach consists in using constant length struts that connect the base to the moving platform but that are mounted on linear or circular rails, like in the invention disclosed in U.S. Pat. No. 6,135,683 (granted to W. K. Bae et al. on Oct. 24, 2000). This approach is applicable to robotic systems but would be difficult to implement for large flight simulators or other applications with large payloads because of the large forces induced in the rails. Also, circular rails are costly and difficult to build with precision, even for robotics applications.

In all of the above systems, kinematic singularities are inevitably present in the workspace of parallel mechanisms. Also, the mechanisms with larger rotational ranges of motion involve link arrangements that lead to bending or use complex guiding tracks, which greatly limits the payload.

It is desired to increase the rotational range of motion of conventional six-degree-of-freedom Gough-Stewart platforms while preserving their most important property, which is that the actuated legs are only subjected to tension or compression loads, thereby leading to high payload to mass ratios. The rotational range of motion is ultimately limited by the kinematic singularities that are present in the workspace of such parallel mechanisms. Also, it is known that the singularities depend on the geometric configuration of the legs, i.e., the position and direction of the lines associated with each of the six legs.

SUMMARY

It is an object of the present invention to provide a novel parallel mechanism with kinematically redundant actuation.

It is an object of the present invention to provide a parallel mechanism that substantially overcomes the disadvantages of the prior art.

It is a still further object of the present invention to provide a novel multi-degree-of-freedom parallel mechanism with large rotational workspace.

Therefore, in accordance with a first embodiment of the present disclosure, there is provided a leg with kinematically redundant actuation for a parallel mechanism comprising: a first sub-leg and a second sub-leg, each said sub-leg comprising a proximal end and a distal end; a link having a proximal end and a distal end; a joint with a rotational degree of freedom (DOF) between and common to the distal ends of each of the first sub-leg and the second sub-leg, and the proximal end of the link; at least one joint providing at least two rotational DOFs at the distal end of the link and adapted to connect the distal end of the link to one end of the parallel mechanism; joints in the first sub-leg and the second sub-leg to provide DOFs to the sub-legs and to connect the proximal ends of the sub-legs to the other end of the parallel mechanism; and at least one degree of actuation (DOA) for each of the first sub-leg and the second sub-leg to control movement of the link.

Further in accordance with the first embodiment, said joints in the first sub-leg and the second sub-leg include: a translational DOF joint in each said sub-leg between its proximal end and its distal end, the DOA for each said sub-leg actuating the translational DOF joint, and at least one joint providing two rotational DOFs at the proximal end of each said sub-leg.

Still further in accordance with the first embodiment, said joints in the first sub-leg and the second sub-leg include: a rotational DOF joint in each said sub-leg between its proximal end and its distal end, a rotational DOF joint at the proximal end of each said sub-leg, the DOA for each said sub-leg actuating the rotational DOF joint at the proximal end, and a common rotational DOF joint connected to the other end of the parallel mechanism, the rotational DOF joints at the proximal ends of the sub-legs being concurrently mounted onto the common rotational DOF joint.

Still further in accordance with the first embodiment, the sub-legs lie in a plane and a rotational axis of the common rotational DOF joint lies in said plane.

Still further in accordance with the first embodiment, said joints in the first sub-leg and the second sub-leg include: a rotational DOF joint at the proximal end of each of the sub-legs, a translational DOF joint upon which is mounted said rotational DOF joint at the proximal end of each of the sub-legs, the DOA for each said sub-leg actuating the translational DOF joint, and a common rotational DOF joint connected to the other end of the parallel mechanism, the translational DOF joints at the proximal ends of the sub-legs being concurrently mounted onto the common rotational DOF joint.

Still further in accordance with the first embodiment, the link and the sub-legs lie in a common plane, with an axis of rotation of the joint with one rotational DOF between and common to the distal ends of the sub-legs being normal to the common plane.

In accordance with a second embodiment, there is provided a spatial parallel mechanism comprising: a platform; a base; at least three of the leg with kinematically redundant actuation described above, each connected at opposed ends to the platform and to the base; and at least three single legs, each single leg comprising at least one joint providing at least two rotational DOFs connecting a distal end of the single leg to one end of the parallel mechanism, joints to provide DOFs to the single leg and to connect the proximal end of the single leg to the other end of the spatial parallel mechanism, and at least one DOA for each of the single leg to actuate movement at one of said joints; wherein the DOAs of the legs with kinematically redundant actuation and of the single legs are actuated to selectively displace the platform along at least one of six DOFs.

Further in accordance with the second embodiment, said joints in each said single leg include: a translational DOF joint between the proximal end and the distal end of said single leg, the DOA for each said single leg actuating the translational DOF joint, and at least one joint providing two rotational DOFs at the proximal end of each said single leg.

Still further in accordance with the second embodiment, the proximal end of the legs with kinematically redundant actuation and of the single legs are connected to the base, and the distal ends of the legs with kinematically redundant actuation and of the single legs are connected to the platform.

In accordance with a third embodiment, there is provided a method for controlling movement of the platform of the spatial parallel mechanism described above, the method comprising: receiving a command to move the platform from a current position and orientation to a desired position and orientation; identifying at least one singularity in the spatial parallel mechanism in a displacement from the current position and orientation of the platform, to the desired position and orientation of the platform; calculating a corrective orientation of the link of at least one the legs with kinematically redundant actuation, the corrective orientation of the link enabling the spatial parallel mechanism to avoid the at least one singularity in said displacement from the current position and orientation of the platform, to the desired position and orientation of the platform; and sending control signals to at least some of the DOAs of the spatial parallel mechanism to move said link to the corrective orientation, and to move the platform to the desired position and orientation via said corrective orientation of the link, thereby avoiding the at least one singularity.

In accordance with a fourth embodiment, there is provided a planar parallel mechanism comprising: a platform; a base; a leg with kinematically redundant actuation comprising a first sub-leg and a second sub-leg, each said sub-leg comprising a proximal end and a distal end, a link having a proximal end and a distal end, a first rotational joint between and common to the distal ends of each of the first sub-leg and the second sub-leg, and the proximal end of the link, a second rotational joint at the distal end of the link connecting the distal end of the link to the platform, joints in the first sub-leg and the second sub-leg to provide DOFs to the sub-legs and to connect the proximal ends of the sub-legs to the base, and at least one DOA for each of the first sub-leg and the second sub-leg to control movement of the link; two single legs connected to the platform by a first rotational joint common to the distal ends of the two single legs, each single leg comprising joints to provide DOFs to the single legs and to connect the proximal end of the single leg to the base of the parallel mechanism, and at least one DOA for each of the single leg to actuate movement at one of said joints; wherein the DOAs of the leg with kinematically redundant actuation and of the single legs are actuated to selectively displace the platform along at least one of three DOFs in a plane.

Further in accordance with the fourth embodiment, said joints in the first sub-leg and the second sub-leg include: a translational joint in each said sub-leg between its proximal end and its distal end, the DOA for each said sub-leg actuating the translational joint, and a third rotational joint at the proximal end of each said sub-leg.

Still further in accordance with the fourth embodiment, wherein said joints in the first sub-leg and the second sub-leg include: a third rotational joint in each said sub-leg between its proximal end and its distal end, a fourth rotational joint at the proximal end of each said sub-leg, the DOA for each said sub-leg actuating the fourth rotational joint.

Still further in accordance with the fourth embodiment, said joints in the first sub-leg and the second sub-leg include: a third rotational joint at the proximal end of each of the sub-legs, a translational joint upon which is mounted said third rotational joint at the proximal end of each of the sub-legs, the DOA for each said sub-leg actuating the translational joint.

Still further in accordance with the fourth embodiment, said joints in each said single leg include: a rotational joint at the proximal end of each of the single legs, and a translational joint upon which is mounted said rotational joint at the proximal end of each of the single legs, the DOA for each said single leg actuating the translational joint.

Still further in accordance with the fourth embodiment, rotational axes of all said rotational joints are normal to said plane.

Still further in accordance with the fourth embodiment, a gripper portion is integral with the link, and another gripper portion is integral with the platform, the gripper portions concurrently forming a gripper actuable by the selective displacement of the platform along at least one of three DOFs in a plane.

In accordance with a fifth embodiment, there is provided a method for controlling movement of the platform of the planar parallel mechanism described above, the method comprising: receiving a command to move the platform from a current position and orientation to a desired position and orientation; identifying at least one singularity in the planar parallel mechanism in a displacement from the current position and orientation of the platform, to the desired position and orientation of the platform; calculating a corrective orientation of the link of the leg with kinematically redundant actuation, the corrective orientation of the link enabling the planar parallel mechanism to avoid the at least one singularity in said displacement from the current position and orientation of the platform, to the desired position and orientation of the platform; and sending control signals to at least some of the DOAs of the planar parallel mechanism to move said link to the corrective orientation, and to move the platform to the desired position and orientation via said corrective orientation of the link, thereby avoiding the at least one singularity.

In accordance with an embodiment of the present disclosure, there is provided a leg for a parallel manipulator comprising: a first sub-leg and a second sub-leg, each said sub-leg comprising a proximal end and a distal end; a link having a proximal end and a distal end; a joint with one rotational degree of freedom (DOF) between and common to the distal ends of each of the first sub-leg and the second sub-leg, and the proximal end of the link; at least one joint with at least two rotational DOFs at the distal end of the link, the at least one joint adapted to connect the distal end of the link to one end of the parallel manipulator; joints in the first sub-leg and a second sub-leg to provide DOFs to the sub-legs and to connect the proximal ends of the sub-legs to the other end of the parallel manipulator; and at least one DOA for each of the first sub-leg and the second sub-leg to control movement of the link in at least two rotational DOFs.

Further in accordance with the present disclosure, there is provided a method for controlling movement of a platform of a parallel mechanism, the method comprising: receiving a command to move the platform from a current position and orientation to a desired position and orientation; identifying at least one singularity in any leg of the parallel mechanism in a displacement from the current position and orientation of the platform, to the desired position and orientation of the platform; calculating a corrective orientation of at least one link of at least one leg having kinematically redundant actuation, the corrective orientation of the link enabling the parallel mechanism to avoid the at least one singularity in said displacement from the current position and orientation of the platform, to the desired position and orientation of the platform; and sending control signals to actuators of the parallel mechanism to move said link to the corrective orientation, and to move the platform to the desired position and orientation via said corrective orientation of the link, thereby avoiding the at least one singularity.

In view of the foregoing, it is an objective of the present invention to provide a novel multi-degree-of-freedom parallel mechanism with kinematically redundant actuation that significantly increases the rotational range of motion by allowing to avoid singularities while subjecting the platform legs to only tension and compression loads, thereby providing very large payload to mass ratios.

Therefore, in accordance with the present invention, there is provided a multi-degree-of-freedom parallel mechanism with kinematically redundant actuation, comprising: a moving platform, connected to a fixed base via a plurality of conventional legs (single legs), each leg providing an actuated (one actuator) six-degree-of-freedom connection between the base and platform; a plurality of double legs, also connecting the fixed base to the platform, each double leg being composed of two conventional six-degree-of-freedom legs pivotally attached at their tip and connected to the platform via an additional link mounted on the pivot joint connecting the two legs and attached to the platform using a spherical joint.

Further in accordance with the present invention, there is provided a redundancy resolution algorithm to calculate the motion of the double legs in order to orient the additional link in a direction that avoids kinematic singularities and/or optimizes the force transmission between the actuators and the moving platform. The redundancy of the double legs is kinematic and does not introduce internal antagonistic forces like in other prior designs.

Still further in accordance with the present invention, there is provided an algorithm for the determination of the forces in the legs in order to compute the required actuator forces for any prescribed motion of the platform.

The above and other objectives of this invention are realized in a specific illustrative embodiment of a six-degree-of-freedom parallel mechanism. The mechanism includes a moving platform connected to the ground base by three conventional UPS legs where U, P and S denote respectively and from base to platform, a universal joint, an actuated prismatic joint and a spherical joint. In addition to the three conventional legs, three double legs connect the base to the platform. Each double leg includes two UP legs connected at their tip by a passive revolute joint (pivot) which connects the two legs to a common link that is in turn attached to the platform via a passive spherical joint. Each of the double legs introduces one degree of redundancy in the mechanism. Therefore, for a given position and orientation of the moving platform, the extension of the conventional legs is determined but the extension of the double legs can take infinitely many values within a feasible range. This allows to control the orientation of the links connecting the double legs to the platform to be chosen, thereby allowing the mechanism to stay away from kinematic singularities since the direction of these legs determines the singularities The orientation of the links connecting the double legs to the platform can be optimized using an algorithm provided in this invention so that the mechanism is kept away from singularities, thereby increasing the workspace, and so that the force distribution in the legs is controlled. This algorithm can be used in real time, while the platform is moving, such that the mechanism is always in an advantageous configuration and that the optimization is always active.

DESCRIPTION OF THE DRAWINGS

A preferred embodiment of the present invention will now be described with reference to the accompanying drawings in which.

DETAILED DESCRIPTION

Figure 1:
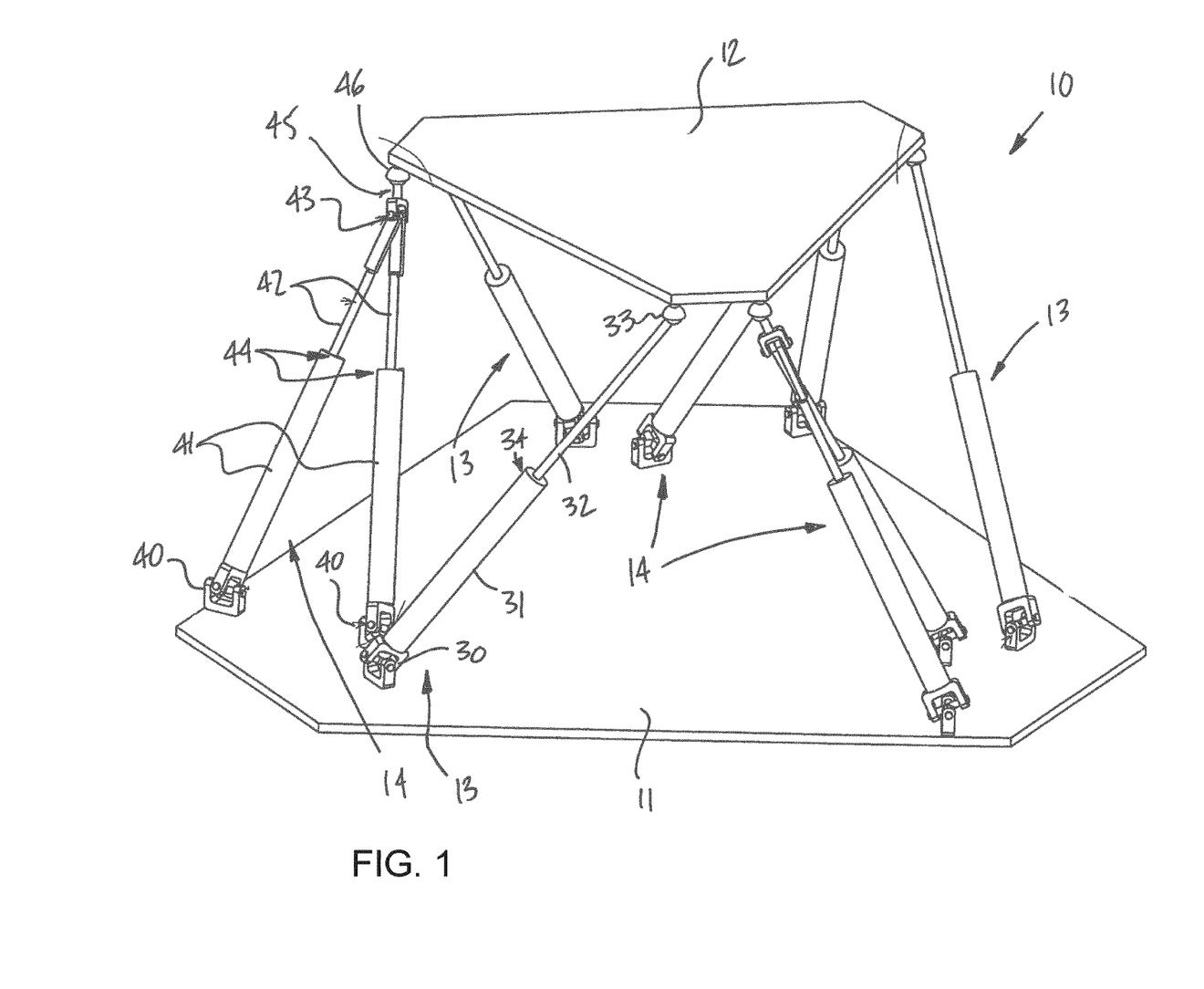
FIG. 1 is a perspective view of a spatial parallel mechanism with kinematically redundant actuation by way of double legs in accordance with an embodiment of the present disclosure.

Referring to the drawings and, more particularly, to FIG. 1, a kinematically redundant spatial parallel mechanism is generally shown at 10. The parallel mechanism 10 is one of numerous parallel mechanisms with up to six degrees of freedom that can be redundantly actuated, i.e., include more actuators than degrees of freedom, to avoid singularities and extend rotational motion capabilities. The parallel mechanism 10 may also be devised to avoid overconstraints, i.e., avoiding the generation of internal forces by the actuators themselves.

The mechanism 10 has a frame 11 (a.k.a., base) and a platform 12, the frame 11 being provided to support a plurality of single legs 13 and a plurality of double legs 14 that actuate the motion of the platform 12. Although a frame 11 is shown as being a defined surface, the single legs 13 and the double legs 14 may be secured directly to the ground. The platform 12 is shown without any components thereon. However, the platform 12 (also referred to as end effector) typically receives thereon equipment, systems, tools, seats, etc, all of which depend on the use of the parallel mechanism 10. Moreover, the mechanism 10 may be upside down relative to the orientation shown in FIG. 1, with the frame 11 being up and the platform 12 being on the ground.

Each of the single legs 13 may be composed of a passive universal joint 30 (i.e., three rotational degrees of freedom, or 3 rDOF, at least two of which are used) connecting the leg 13 to the base 11, a first moving link 31, a second moving link 32 and a passive spherical joint 33 (3 rDOF, at least two of which are used) that connects the leg 13 to the platform 12. The first moving link 31 and the second moving link 32 are interconnected to form a prismatic (sliding) joint 34 which may provide the actuation of the leg 13. This joint 34, providing one translation degree of freedom (1 tDOF), can be a hydraulic cylinder, an electric linear actuator, an electric ball-screw system, a pneumatic cylinder or any other means of providing linear actuation. While a single configuration is shown for the single legs 13, it is considered to provide different arrangements as well. For example, sub-legs of double legs 14 will be described hereinafter, with reference to FIGS. 3 and 4, and the single leg 13 may adopt some of the configuration of these sub-legs, in terms of joint positioning and location of actuators.

Figure 2:
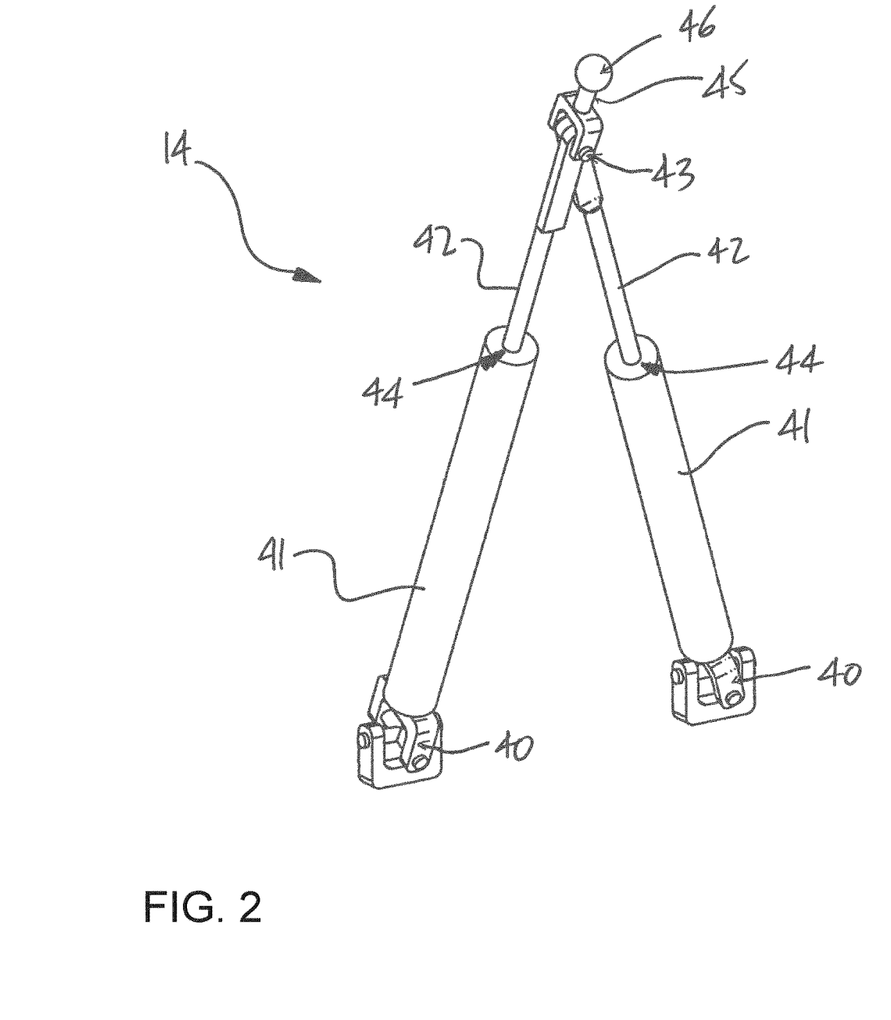
FIG. 2 is a perspective view of one of the double legs included in the parallel mechanism of the present disclosure.

Referring concurrently to FIGS. 1 and 2, there is illustrated one possible configuration of the double leg 14. Each of the double legs 14 includes two sub-legs, whereby the expression "double leg" is used to describe the leg 14. Each sub-leg of the double leg 14 includes a passive universal joint 40 (3 rDOF, at least two of which are used, which makes the passive universal joint 40 a 2 rDOF) that connects the sub-leg to the base 11, a first moving link 41, a second moving link 42. The second moving links 42 of each of the two sub-legs of a double leg 14 are connected by a common passive pivot 43 (a.k.a., revolute joint, one rDOF), whereby the second moving links 42 share a rotational axis.

The moving links 41 and 42 are interconnected in each sub-leg by a prismatic (sliding) joint 44 that provides actuation of the tDOF between the links 41 and 42. This joint 44, providing one translation degree of freedom (tDOF), can be a hydraulic cylinder, an electric linear actuator, an electric ball-screw system, a pneumatic cylinder or any other means of providing linear actuation. There are two actuators in a double leg 14, i.e., one for each joint 44.

The common passive pivot 43 connects the sub-legs to an additional moving link 45 that is connected to the moving platform 12 by a passive spherical joint 46 (3 rDOF). In an embodiment, the moving link 45 lies in a plane that is parallel to a direction of both the joints 44, and the rotational axis of the 1 DOF pivot 43 is normal to this double-leg plane, as this arrangement allows the double leg 14 to work solely in tension/compression.

In the parallel mechanism 10 of FIG. 1, there are three single legs 13 and three double legs 14, for a total of nine degrees of actuation (DOA), namely one for each of the joints 34 and 44. For clarity and practical purposes, the mechanism 10 represented in FIG. 1 includes three single legs 13 and three double legs 14. However, different combinations could be used, for example four double legs 14 and two single legs 13, or four single legs 13 and two double legs 14. The passive joints, joints that are not actuated unlike the joints 34 and 44, in each of the legs can be replaced with alternative components, provided the same degrees of freedom are available. For example, the passive spherical joints 33 and 46 can be replaced with three passive pivots or with a universal joint and one pivot and the passive universal joints 30 and 40 can be replaced with two passive pivots. Moreover, the terminology passive joint is used to indicate degrees of freedom that are not actuated, as opposed to active joints. While the legs 13 and 14 are described as having active and passive joints, they may also comprise inactive joints, i.e., joints that do not provide any other significant degrees of freedom.

Depending on the application, it could be advantageous to place the attachment points of the legs 13 and 14 to the base 11 and to the platform 12 in different locations. For example, the mechanism 10 can be assembled upside-down, with the platform 12 below the base 11. Also, the attachment points on the base 11 or on the platform 12 do not necessarily have to be coplanar.

Figure 3:
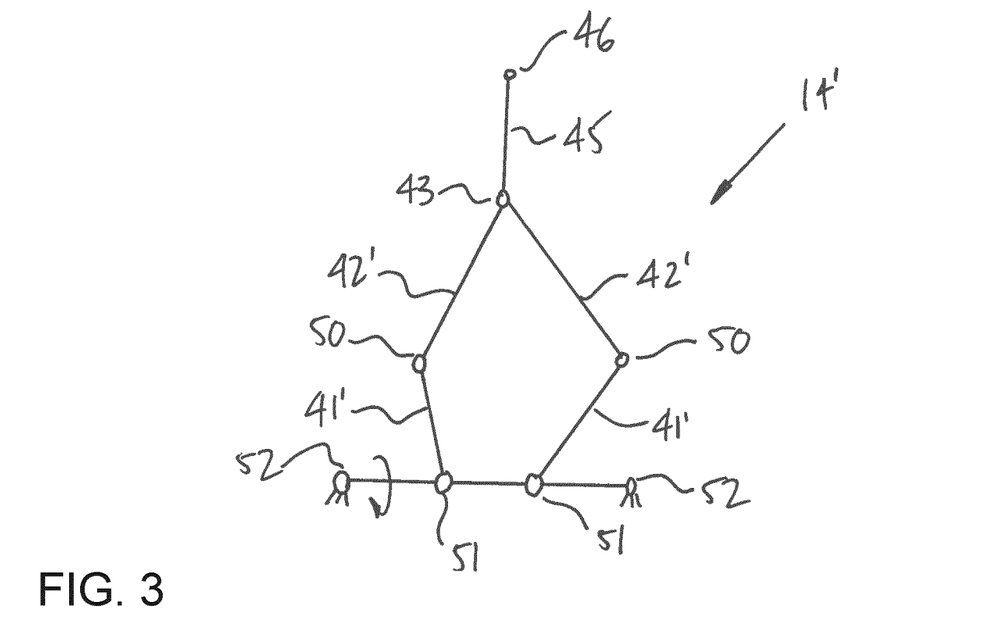
FIG. 3 is a schematic view of a double leg in accordance with another embodiment of the present disclosure.
Figure 4:
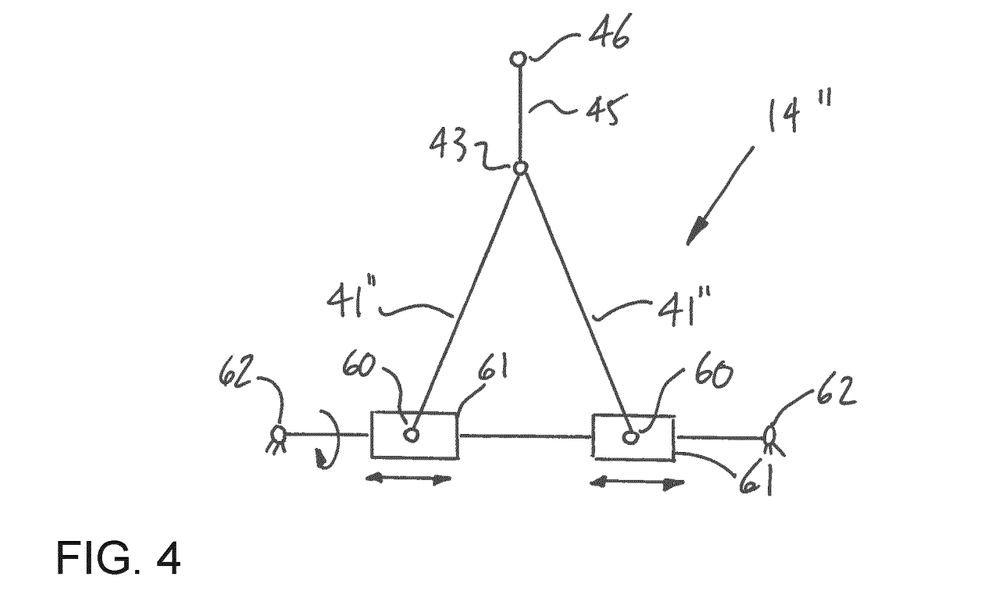
FIG. 4 is a schematic view of a double leg in accordance with yet another embodiment of the present disclosure.

Other combinations of double legs 14 are contemplated to offer the same possibility of avoiding singularities, two of which are respectively shown in FIGS. 3 and 4.

Referring to FIG. 3, there is illustrated a double leg 14', that has some of the same arrangement of components as the double leg 14 of FIG. 2, whereby like components will share like reference numerals. One such similar arrangement of components is the common passive pivot 43, the moving link 45 and the passive spherical joint 46, all of which are connected to the sub-legs to allow the optimization of the direction of the link 45 to avoid singularities.

The sub-legs are defined by moving links 41' and 42', which differ from the moving links 41 and 42 of FIG. 2 by the presence of a pivot joint 50 instead of prismatic joint 44 as in the embodiment of FIG. 2. Moreover, the moving links 41' and 42' are connected to the frame 11 by pivot joints 51 at the ends of the moving links 41' and 42', the pivot joints 51 being concurrently mounted to an additional pivot joint 52 rotatably connected to the frame 11. The rotational axes of the pivot joints 50 and 51 of moving links 41' and 42' are all parallel to one another (i.e., all four axes). In order to avoid flexion in links 42' and 45, the rotational axes of the pivot joints 50 and 51 of moving links 41' and 42' are also parallel to the axis of the common passive pivot 43, with all these axes being normal to a plane of the double leg 14'. Also, the axis of pivot 52 is included in the plane of leg 14'.

In order to adjust the direction of the link 45 to avoid singularities, the actuators may be provided at each of the pivot joints 51. Hence, with two rotational degrees of actuation, the double leg 14' may avoid singularities. In this embodiment, the actuators produce a rotational output, and may be electric motors for instance.

Referring to FIG. 4, there is illustrated a double leg 14", that has some of the same arrangement of components as the double leg 14 of FIG. 2 and the double leg 14' of FIG. 2, whereby like components will share like reference numerals. Once more, a similar arrangement of components is the common passive pivot 43, the moving link 45 and the passive spherical joint 46, all of which are connected to the sub-legs to allow the optimization of the direction of the link 45 to avoid singularities.

The sub-legs of the double leg 14" are defined by links 41", which are each connected by a pivot joint 60 to a respective prismatic joint 61. Moreover, the sub-legs are connected to the frame 11 by an additional pivot joint 62 rotatably connected to the frame 11, with the prismatic joints 61 concurrently mounted to a shaft of the pivot joint 62. Hence, in this embodiment, the direction of the prismatic joints 61 is parallel to the axis of the pivot joint 62.

In the double leg 14", the rotational axes of the pivot joints 60 are parallel to one another. In order to avoid flexion in the leg 14", the rotational axes of the pivot joints 60 of the double leg 14" is also parallel to the axis of the common passive pivot 43, with all these axes being normal to plane of the double leg 14". Also, the axis of pivot 62 is included in the plane of leg 14".

In order to adjust the direction of the link 45 to avoid singularities, the degrees of actuation may be provided at each of the prismatic joint 61, i.e., the translation is actuated. Hence, with two translational degrees of actuation, the double leg 14" may avoid singularities. In this embodiment, the actuators may be any appropriate form of linear actuator as mentioned above for the double leg 14 of FIG. 2.

Therefore, it is proposed to introduce some redundancy in some of the legs in order to provide some control over the direction of the lines that define the singularities. A key issue may then be to introduce this redundancy while preserving the tension/compression loading in the legs, i.e., without introducing bending loads or internal forces. The various planar relations described above prevent the introduction of bending loads or internal forces.

It is pointed out that, although not shown for simplifying the drawings, the parallel mechanism 10 may be operated by a processor (e.g., a computer, etc) that drives the degrees of actuation of the parallel mechanism 10, as a function of desired position and/orientation for the platform 12 as input by an operator manipulating the parallel mechanism 10. For this purpose, the various joints and actuators of the parallel mechanism 10 are monitored to continuously know their geometric relation to one another. The geometric relations of the joints, for instance obtained by appropriate sensors (e.g., rotary encoders, magnetic sensors, etc), are used in the algorithm leading to the singularity-less control of the movements of the platform 12.

Now that an exemplary spatial parallel mechanism 10 has been described, along with various configurations for its double legs (e.g., 14, 14' and 14"), the algorithm to solve its inverse kinematic problem is set forth. The method is described with reference to the spatial parallel mechanism 10 of FIG. 1 with the double leg 14, although a similar approach may be used with the double legs 14' and 14".

When the mechanism 10 is in operation, the position and orientation of the platform 12 is prescribed at each time step, according to the application. For a given position and orientation of the platform 12, the extension of the actuators of the joints 34 of the single legs 13 is readily computed. For the double legs 14, because of the kinematic redundancy, an algorithm is required to compute the extension of the actuators of the joints 44 since infinitely many combinations of the extensions of the two actuators of the double leg 14 are possible. The algorithm is based on the optimization of the direction of the link 45 that connects the double leg 14 to the platform 12. Indeed, it is known that the kinematic singularities are dependent on the direction of the links that connect each of the legs 13 and 14 to the platform 12. By optimizing the direction of the links 45, which is accomplished by selecting a proper combination of the extensions of the two actuators for the joints 44 of a double leg 14, it is possible to keep the mechanism 10 away from singularities. The mathematical optimization can be implemented using a gradient search technique or other mathematical tools using a performance index that can be the condition number of the Jacobian matrix of the mechanism, the determinant of the Jacobian matrix, the kinematic sensitivity of the Jacobian matrix or other means of ensuring that the configuration adopted by the double legs 14 is appropriate, such that the mechanism is kept away from singularities and such that the forces in the actuators remain within prescribed limits. The result of the optimization will yield the extensions of the actuators 44 of the double legs 14. It is pointed out that one of the key features of the disclosure is that kinematic redundancy is introduced to alleviate singularities, thereby increasing the workspace. At the same time, the parallel mechanism 10 may be configured such that all actuated legs are subjected to tension/compression forces only and no actuation redundancy (capability to generate internal forces using the actuators) is introduced.

Figure 6:
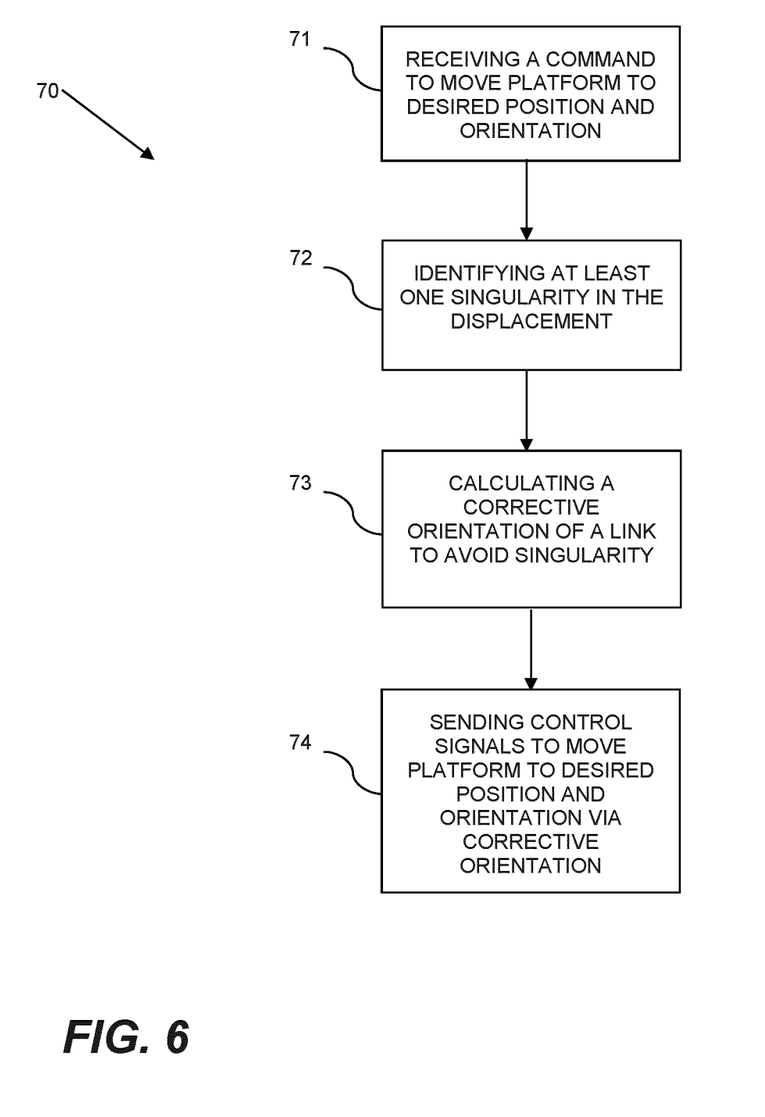
FIG. 6 is a diagram illustrating the principle of the algorithm that performs the optimization of the configuration of the redundant parallel mechanism featuring the double legs of any one of FIGS. 2 to 4.

Hence, referring to FIG. 6, there is illustrated a method 70 for controlling movement of the platform 12 of a parallel mechanism, such as the parallel mechanism 10 of FIG. 1, or any other parallel mechanism featuring legs such as legs 14/14'/14".

According to 71, the processor of the parallel mechanism 10 receives a command to move the platform 12 from a current position and orientation to a desired position and orientation. The current position and orientation may be continuously calculated by the processor.

According to 72, singularities are identified in the parallel mechanism 10 in a displacement from the current position and orientation of the platform 12, to the desired position and orientation of the platform 12.

Figure 5:
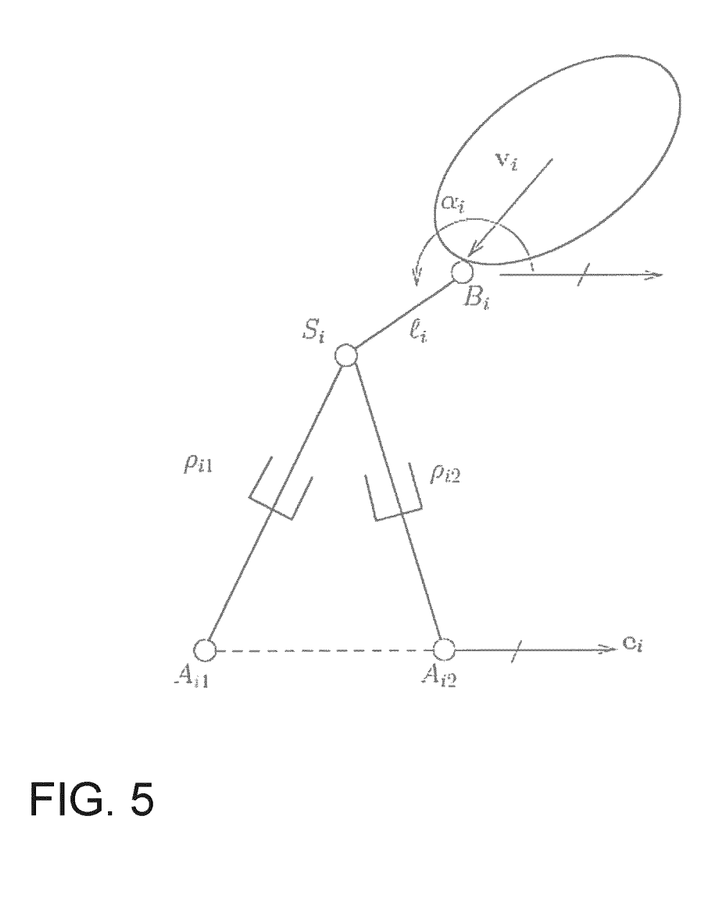
FIG. 5 is a schematic illustration of the double leg of FIG. 2 illustrative of data taken into account when solving an inverse kinematic problem to control its actuation.

In order to identify the singularities, consider a parallel mechanism with k redundant legs each containing two prismatic actuators (e.g., such as double legs 14) and (6−k) conventional legs each containing one prismatic actuator (e.g., such as single leg 13). Referring to FIG. 5, the position vector(s) of the centre of the Hooke joint(s) (i.e., universal joint(s)) attached to the base, points Aij, is noted ai for the conventional legs (e.g., 13) and respectively ai1 and ai2 for redundant (double) legs (e.g., 14, 14', 14"). Similarly, the position vector of the centre of the spherical joint connecting the ith leg to the platform, point Bi, is noted bi. For redundant legs, the position vector of the centre of the revolute joint (e.g., common passive pivot 43 in FIGS. 1 and 2) connecting the two sublegs, point Si, is noted si. Additionally, a unit vector ei is defined along the axis connecting the centres of the Hooke joints of the ith redundant leg, namely:

$$e_i = \frac{a_{i1} - a_{i2}}{\|a_{i2} - a_{i1}\|} \qquad (1)$$

where $\|\cdot\|$ stands for the norm of its vector argument, and the length of the link connecting point Si to point Bi is noted li. Finally, the extension of the ith leg is noted pi if the latter is a conventional leg while the extension of the sublegs are noted ρi1 and ρi2 if the leg is a redundant leg.

The Cartesian coordinates of the moving platform (e.g., platform 12 in FIG. 1) are given by the position vector of the reference point P on the platform, noted p, and the orientation of the platform, given by matrix Q, which represents the rotation from the fixed reference frame Oxyz to the moving reference frame Px'y'z' attached to the platform. The position vector of the centre of the ith spherical joint connecting leg i to the platform can then be written as $$b_i = p + Q v_{i0}, \quad i=1, \ldots, 6 \tag{2}$$

where $v_{i0}$ is the position vector of point Bi with respect to point P, expressed in the reference frame attached to the platform. For a given mechanism, this vector is constant.

The Jacobian matrices of the mechanism are obtained from the velocity equations, which are written as:

$$J\dot{t} = K\dot{p} \tag{3}$$

where J is a 6×6 matrix and K is a (6×(6+k)) matrix. These Jacobian matrices can be shown to have the following structure $$J = \begin{bmatrix} (s_1 - b_1)^T & [Qv_{10} \times (s_1 - b_1)]^T \\ \vdots & \vdots \\ (s_k - b_k)^T & [Qv_{k0} \times (s_k - b_k)]^T \\ (b_{k+1} - a_{k+1})^T & [Qv_{(k+1)0} \times (b_{k+1} - a_{k+1})]^T \\ \vdots & \vdots \\ (b_6 - a_6)^T & [Qv_{60} \times (b_6 - a_6)]^T \end{bmatrix} \tag{4}$$

where it is assumed that the legs numbered from 1 to k are the redundant legs while the legs numbered from k+1 to 6 are the conventional legs. It can be observed, from eq. (4), that the rows of matrix J are the Plucker coordinates of lines. The line of the Jacobian corresponding to a conventional leg is formed with the Plucker coordinates of the line connecting point Ai to point Bi while the line of the Jacobian matrix corresponding to a redundant leg is formed with the Plucker coordinates of the line connecting point Si to point Bi.

Matrix K is also readily obtained based on the above velocity equations. For a mechanism comprising k redundant legs and 6−k conventional legs, matrix K is of dimension 6×(6+k) and has the following form $$K = \begin{bmatrix} K_1 & 0_{k \times (6-k)} \\ 0_{(6-k) \times 2k} & K_2 \end{bmatrix} \tag{5}$$

where $0_{i \times j}$ stands for a zero matrix of dimension i×j and where matrix K1 is written as $$K_1 = \begin{bmatrix} r_1^T m_1 & r_1^T n_1 & 0 & 0 & 0 & \cdots & 0 \\ 0 & 0 & r_2^T m_2 & r_2^T n_2 & 0 & \cdots & 0 \\ & & & \ddots & & & \\ 0 & 0 & 0 & \cdots & 0 & r_k^T m_k & r_k^T n_k \end{bmatrix} \tag{6}$$

in which one has $r_i = (s_i - b_i)$ and where one has $$m_i = \frac{\rho_{i1}}{\mu_i} [(s_i - a_{i2}) \times [(b_i - a_{i1}) \times e_i]] \tag{7}$$

$$n_i = \frac{\rho_{i2}}{\mu_i} [[(b_i - a_{i1}) \times e_i] \times (s_i - a_{i1})] \tag{8}$$

$$\mu_i = [(s_i - a_{i1}) \times (s_i - a_{i2})]^T [(b_i - a_{i1}) \times e_i] \tag{9}$$

while matrix K2 is the following diagonal matrix $$K_2 = \text{diag}[\rho_{k+1}, \ldots, \rho_6] \tag{10}$$

where it is assumed that the legs numbered from i to k are the redundant legs while the legs numbered from k+1 to 6 are the conventional legs. It can be observed that the first k lines of matrix K, associated with the redundant legs, each contain two nonzero entries while the last (6−k) lines, associated with the conventional legs each contain one nonzero entry (matrix K2 is a (6−k)×(6−k) diagonal matrix). The redundancy of the robot is apparent from matrix K, which contains two columns for each of the k redundant legs.

Still referring to FIG. 6, at 73, a corrective orientation of the common link 45 of one of the legs 14/14'/14" is calculated, as the corrective orientation of the link 45 enables the parallel mechanism 10 to avoid the singularities identified in 72 in said displacement from the current position and orientation of the platform, to the desired position and orientation of the platform. The corrective orientation is calculated using the solution of the inverse kinematic problem of the kinematically redundant parallel mechanism 10.

The solution of the inverse kinematic problem of the kinematically redundant parallel mechanism 10 described above consists in determining all joint coordinates for a given pose—position and orientation—of the platform 12. Because the mechanism 10 is kinematically redundant, the inverse kinematic problem has infinitely many solutions. Indeed, when the pose of the platform 12 is prescribed, the position of points Bi is uniquely determined. For the conventional legs (e.g., the single legs 13), the joint coordinates, $\rho_i$, are therefore also uniquely determined. However, in each of the redundant legs (e.g., 14/14'/14"), it can be observed that point Si is only constrained to lie on a circle of radius li centered at Bi and inscribed in a plane defined by points Si, Bi, Ai1 and Ai2 and that the position on this circle can be chosen arbitrarily by varying $\rho_{i1}$ and $\rho_{i2}$. Moreover, as explained above and as clearly seen in eq. (4), the singularities of the mechanism 10 are governed by the Plucker lines of the conventional legs 13 and of the links 45 connecting points Si and Bi for the redundant legs 14/14'/14". Therefore, when solving the inverse kinematic problem for the redundant legs 14/14'/14", it should be possible to select solutions that correspond to orientations of the links 45 connecting Si and Bi that avoid singularities. In other words, each of the redundant legs 14/14'/14" introduces an additional degree of freedom that can be exploited to reorient link SiBi to the corrective orientation and avoid singularities. In order to formulate the optimization problem, a variable ai is introduced for each of the redundant legs 14/14'/14" that represents the orientation of link SiBi with respect to the direction of unit vector ei, as illustrated in FIG. 5. One can write $$(s_i - b_i) = l_i \cos \alpha_i e_u + l_i \sin \alpha_i f_i \tag{11}$$

where fi is a unit vector orthogonal to vector ei and located in the plane of redundant leg i, defined by points Bi, Ai1 and Ai2. Vector fi is readily computed using $$f_i = \frac{(b_i - a_{i1}) - ((b_i - a_{i1})^T e_i) e_i}{\|(b_i - a_{i1}) - ((b_i - a_{i1})^T e_i) e_i\|} \tag{12}$$

The inverse kinematic problem can therefore be formulated as follows: for a prescribed pose of the platform, first compute the actuated joint coordinates of the conventional legs 13 (the solution is unique) and then determine the actuated joint coordinates of the redundant legs 14/14'/14" in order to maximize the 'distance' to singularities. Clearly, there is no generally accepted measure of the distance to singularities but several indices proposed in the literature can be used here since the purpose is simply to avoid singularities and not necessarily to find optimum configurations. Such indices include the dexterity, the determinant of the Jacobian matrix, the condition number of a normalized Jacobian matrix, the kinematic sensitivity, or others. The kinematic sensitivity is suggested because of its clear geometric meaning and because it does not suffer from unit inconsistencies. Translational and orientational kinematic sensitivity can be used in order to ensure that all singularities are avoided. Let $\eta$ be the chosen index to be minimized in order to avoid singularities. The inverse kinematic problem can then be formulated as follows, assuming k redundant legs numbered from 1 to k and (6−k) conventional legs numbered from (k+1) to 6.

The solution of the inverse kinematic problem of kinematically redundant manipulators consists in obtaining the minimum norm solution of the joint velocity vector that produces the prescribed Cartesian velocity vector and in adding an extra term to the joint velocity vector that is contained in the nullspace of the Jacobian matrix, which is used to optimize some performance index.

Referring to eqs.(3), (4) and (5) and assuming that matrix J is of full rank, eq.(5) can be rewritten as $$t = J^{-1} K \dot{\rho} = U \dot{\rho} \quad (13)$$

which is the standard form of the velocity equations for kinematically redundant manipulators, where matrix U is of dimension 6×(6+k). Since matrix J is of full rank, the nullspace of matrix U is simply the nullspace of matrix K. Also, by observation of eqs. (6) and (10), the nullspace of matrix K, noted N(K) is readily obtained and can be described as $$\mathcal{N}(K) = \left\{ u \in \mathcal{R}^{6+k} \mid u = \sum_{i=1}^{k} \alpha_i \sigma_i \cdot \alpha_i \in \mathcal{R} \right\} \quad (14)$$

with vector σi defined as $$\sigma_i = [0\ 0\ \ldots\ r_i^T n_i\ -r_i^T m_i\ 0\ \ldots\ 0]^T, \ i=1\ldots k. \quad (15)$$

In other words, vector σi, has (6+k) components and only two nonzero entries located in position (2i−1) and 2i. It can be observed that the last (6−k) components of vector σi are all equal to zero. This corresponds to the fact that, for a given position and orientation of the platform 12, the length of the (6−k) non-redundant legs is determined. It can also be observed that vectors σi form a set of orthogonal vectors, which corresponds to the fact that the redundancy of the robot is decoupled, i.e., the adjustment of the direction of the end link of one of the redundant legs has no impact on the orientation of the other legs. Hence, the resolution of the redundancy is readily computed. The general solution of the velocity equations can then be written as $$\dot{p} = U^I t - \xi (1 - U^I U) \frac{\partial \eta}{\partial \rho} \quad (16)$$

$$= U^I t - \xi P \frac{\partial \eta}{\partial \rho} \quad (17)$$

where $U^I$ is the generalized inverse corresponding to the minimum norm solution, namely $U^I = U^T(UU^T)^{-1}$, $\xi$ is a scaling factor used to adjust the magnitude of the second term of the solution with respect to the first one, $\eta$ is a performance index to be minimized and matrix $P = (1 - U^I U)$ projects any vector in the nullspace of matrix U, where 1 stands for the identity matrix. Based on the above description of the nullspace of matrix U (eq.(14)) and since vectors $\sigma_i$ form an orthogonal base of this nullspace, it is clear that the second term of eq.(17) can be readily computed as the following sum of scalar products, namely $$P \frac{\partial \eta}{\partial \rho} = \sum_{i=1}^{k} \left[ \frac{1}{\|\sigma_i^2\|} \left( \sigma_i^T \frac{\partial \eta}{\partial \rho} \right) \sigma_i \right] \quad (18)$$

which is computationally much more efficient.

In practice, since the last (6 − k) components of vector a are equal to zero, the last (6−k) components of vector δη/δρ do not need to be computed. This corresponds to the fact that the non-redundant legs do not contribute to the redundancy resolution. The above described scheme is used to solve the inverse kinematic problem of the kinematically redundant parallel mechanism 10.

Returning to FIG. 6, with the corrective orientation of the common link 45 calculated, the processor may send control signals as per 74 to the actuators of the parallel mechanism 10 to move the common link 45 to the corrective orientation, and to move the platform 12 to the desired position and orientation via said corrective orientation of the link 45, thereby avoiding the at least one singularity. The method described above may be part of a set of non-transient instructions part of the processor or mechanism controller.

Figure 7:
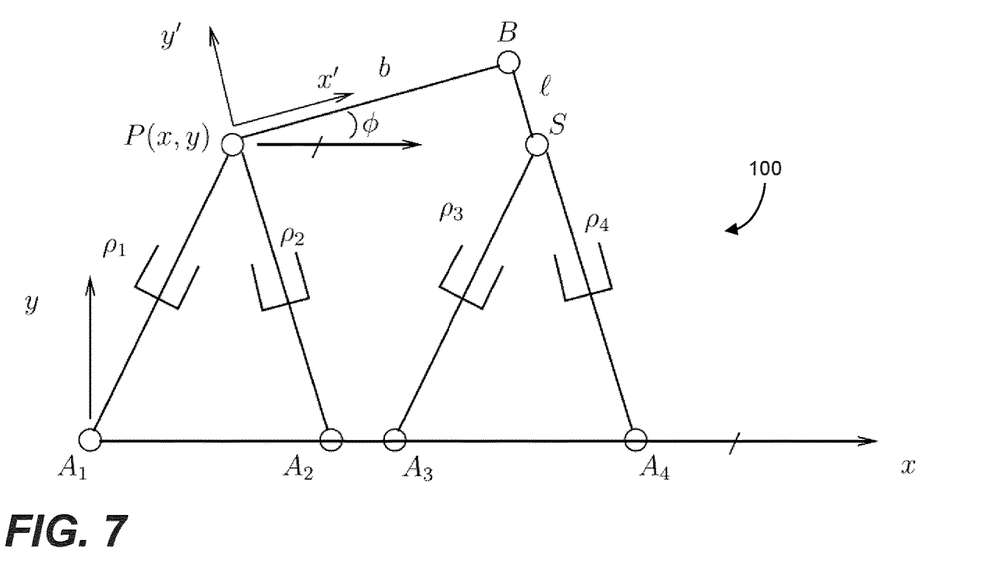
FIG. 7 is a schematic view of a planar parallel mechanism with kinematically redundant actuation by way of a double leg in accordance with an embodiment of the present disclosure, with RPR legs and sub-legs.

Referring to FIG. 7, there is illustrated a planar kinematically redundant parallel mechanism at 100, the planar parallel mechanism 100 being configured to avoid direct kinematic singularities in displacements of its platform. The planar parallel mechanism 100 may therefore effect an unlimited range of rotations of its platform in a plane, and yet avoid actuation redundancy. The proposed kinematically redundant mechanism 100 of FIG. 7 has an RPR architecture for its single legs (a sequence of revolute (rotational) joint/prismatic joint/revolute joint). More particularly, two RPR legs are attached to a common point P of platform PB.

A double leg, which bears similarities with the double legs 14/14'/14" of FIGS. 1-5 relates the ground to the platform PB. The two sub-legs of the double leg are attached to a common revolute joint at point S that connects the sub-legs to a link BS attached to the platform by a second revolute joint at point B. The planar parallel mechanism 100 has four actuators (degrees of actuation) and four DOFs. Hence, with the axes of all revolution joints being normal to a plane of movement of the platform PB, there is no actuation redundancy, and no internal forces can be generated on the platform PB.

The four controllable DOFs can be chosen as the position and orientation of the platform PB plus the orientation of link SB with respect to the platform PB. Moreover, as it will be shown below, the singularities of the mechanism 100 correspond to the degeneracy of the three lines defined along the single legs $A_1P$ and $A_2P$ and the link SB. Therefore, by controlling the orientation of the link SB relative to the platform PB, singularities may be avoided when displacing the platform PB to any position and orientation in its working plane. Since lines defined along $A_1P$ and $A_2P$ intersect at point P, it suffices to ensure that the line defined along segment SB does not go through point P. For instance, maintaining the link SB orthogonal to the platform PB guarantees that the three lines are as "far" as possible from intersecting. Therefore, one simple approach to the trajectory planning of the mechanism 100 is to consider the revolute joint at point B to be inactive and fixed in an orientation that makes the link SB orthogonal to the platform PB, to compute the position of points P and S based on the latter assumption and the prescribed position and orientation of the platform PB, and, finally, to compute the actuator lengths accordingly. If the geometric parameters of the mechanism 100 are chosen properly, this approach leads to a mechanism design that is singularity-free and that has unlimited rotational motion in its working plane, as it will be demonstrated below. Finally, it is pointed out that the proposed architecture can be applied to other types of single legs and sub-legs such as PRR and RRR.

The kinematic modeling of the planar kinematically redundant four-DOF parallel mechanism 100 is now presented. Referring to FIG. 7, a fixed reference frame $A_1xy$ is defined on the base, and a moving reference frame $Px'y'$ is defined on the platform PB. Without loss of generality, the origin of the fixed frame is located at point $A_1$—the attachment point of the first single leg $A_1P$ to the base—and the origin of the moving frame (the platform PB) is located at point P—the attachment point of single legs $A_1P$ and $A_2P$ to the platform PB. In the fixed reference frame, the position vector of the center of the revolute joints attached to the base, points Ai, i=1, . . . , 4, is noted ai. Similarly, the position vector of the center of the revolute joint connecting link SB to the platform, point B, is noted b, the position vector of point S is noted s, and the position vector of point P is noted p. Although points Ai, i=1, . . . , 4, are aligned in the schematic of FIG. 7, the analysis presented here is general, and no special geometric arrangement of the latter points is assumed, except for the fact that points A1 and A2 should not be coincident (likewise for points A3 and A4) for the mechanism 100 to function.

The Cartesian coordinates of the moving platform PB are given by the position vector of the reference point P on the platform PB, vector p, and the orientation of the platform PB, given by matrix Q, which represents the rotation from the fixed reference frame $A_1xy$ to the moving reference frame $Px'y'$ attached to the platform PB, written as $$Q = \begin{bmatrix} \cos\phi & -\sin\phi \\ \sin\phi & \cos\phi \end{bmatrix} \quad (19)$$

where φ is the angle defined between the x-axis of the fixed frame and the x'-axis of the moving frame PB. In addition, vector v is defined as the vector connecting point
P to point B, expressed in the moving frame, namely $$v = [b\ 0]^T \quad (20)$$

where b is the distance between point P and point B (platform length). The distance between points S and B, i.e., the length of the link SB is noted $l$ and the actuator extensions (joint coordinates) are noted ρi, i=1, . . . , 4, which correspond, respectively, to the length of segments $A_1P$, $A_2P$, $A_3S$, and $A_4S$. With the above definitions, the position vector of point B can then be written as $$b = p + Qv. \quad (21)$$

Differentiating (21) with respect to time, one then obtains $$\dot{b} = \dot{p} + \dot{Q}v = \dot{p} - \dot{\phi}EQv \quad (22)$$

where $$E = \begin{bmatrix} 0 & -1 \\ 1 & 0 \end{bmatrix}. \quad (23)$$

Considering the two single legs of the mechanism 100, the distance between point P of the platform and points $A_1$ and $A_2$ can be written as $$\rho_i^2 = (p-a_i)^T(p-a_i),\ i=1,2. \quad (24)$$

Differentiating (24) with respect to time then leads to $$\rho_i\dot{\rho}_i = (P-a_i)^T\dot{p}.\ i=1,2. \quad (25)$$

The sub-legs of the mechanism 100 are then considered. First, the constraint introduced by the link SB, namely the constant distance between points S and B, can be written as $$(s-b)^T(s-b) = l^2. \quad (26)$$

Differentiating (26) with respect to time, one then obtains $$(s-b)^T\dot{s} = (s-b)^T\dot{b}. \quad (27)$$

Then, the distance between point S and points A3 and A4 can be written as $$\rho_i^2 = (s-a_i)^T(s-a_i).\ i=3,4. \quad (28)$$

Differentiating (28) with respect to time then yields $$\rho_i\dot{\rho}_i = (s-a_i)^T\dot{s},\ i=3,4 \quad (29)$$

which can be written in matrix form as $$H\dot{s} = h \quad (30)$$

where matrix H and vector h are obtained as $$H = \begin{bmatrix} (s-a_3)^T \\ (s-a_4)^T \end{bmatrix}. \quad (31)$$

$$h = \begin{bmatrix} \rho_3\dot{\rho}_3 \\ \rho_4\dot{\rho}_4 \end{bmatrix}.$$

It can readily be observed that matrix H is always of full rank as long as the sub-legs are not aligned, which is easily ensured by design. Therefore, (30) can be inverted in order to express vector s as a function of the velocity of the actuators of the sub-legs. Based on (31), a simple robust analytical form of the inverse relationship can be written as $$\dot{s} = Nh \quad (32)$$

with $$N = \frac{1}{(s-a_3)^T E(s-a_4)}[E(s-a_4) - E(s-a_3)]. \quad (33)$$

Finally, the substitution of (37) and (22) into (27) leads to the relationship between the Cartesian velocity of the platform—defined with vector p and scalar φ—and the velocity of the sub-legs, namely $$(s-b)^T(\dot{p}+\dot{\phi}EQv) = (s-b)^T Nh. \quad (34)$$

Equations (25) and (34) form a system of three equations relating the three components of the Cartesian velocities to the four joint velocities.

Following the standard notation generally used for parallel mechanisms, the relationship between the joint velocities and the Cartesian velocities of the kinematically redundant planar parallel mechanism introduced above is written as $$Jt = K\dot{\rho} \quad (35)$$

where t is the vector of Cartesian velocities defined as $t=[p^T\ \varphi]^T$, and ρ is the vector of joint velocities defined as ρ=[ρ1

ρ2 ρ3 ρ4]$^T$. Hence, matrix J is a 3×3 matrix, while matrix K is a 3×4 matrix. The kinematic redundancy is apparent from matrix K.

Equation (25) is used to construct the first two rows of the Jacobian matrices, while (34) is used to construct the third row, leading to $$J = \begin{bmatrix} (p-a_1)^T & 0 \\ (p-a_2)^T & 0 \\ (s-b)^T & (s-b)^T EQv \end{bmatrix} \quad (36)$$

$$K = \begin{bmatrix} \rho_1 & 0 & 0 & 0 \\ 0 & \rho_2 & 0 & 0 \\ 0 & 0 & k_{33} & k_{34} \end{bmatrix} \quad (37)$$

where $$k_{33} = \frac{(s-b)^T E(s-a_4)\rho_3}{(s-a_3)^T E(s-a_4)} \quad (38)$$

$$k_{34} = \frac{-(s-b)^T E(s-a_3)\rho_4}{(s-a_3)^T E(s-a_4)}. \quad (39)$$

It can be observed, from (36), that the rows of matrix J are the planar coordinates of lines. Indeed, rows 1 and 2 correspond to lines defined along segments $A_1P$ and $A_2P$, while row 3 corresponds to a line defined along segment SB. This observation confirms the possibility to avoid all singularities by using the redundancy to control the orientation of link SB with respect to the platform. Indeed, matrix J will always be of full rank as long as the aforementioned three lines are not dependent. In the special case described above, in which the single legs $A_1P$ and $A_2P$ are connected to a common attachment point P on the platform PB, it suffices to ensure that the line defined along segment SB does not pass through point P and that legs $A_1P$ and $A_2P$ are not aligned.

The structure of matrix K can also be analyzed. It appears clearly that the latter matrix is of full rank as long as none of the joint coordinates ρi, i=1, ... , 4, is equal to zero and as long as the sub-legs are not aligned. Again, these conditions are easily satisfied by design.

The solution of the inverse kinematic problem of the planar kinematically redundant parallel mechanism 100 described above consists in determining all joint coordinates for a given pose—position p and orientation φ—of the platform. Since the mechanism is kinematically redundant, the inverse kinematic problem has infinitely many solutions. As mentioned above, one possible approach consists in using the kinematic redundancy to maintain the link SB orthogonal to the platform BP, thereby avoiding all direct kinematic singularities. Indeed, from (36), it is clear that this solution corresponds to staying as "far away" as possible from the geometric condition that corresponds to a singular configuration, i.e., the alignment of links SB and BP. This particular solution is straightforward, robust, and easy to implement in a practical situation. It should be preferred in most cases. The following algorithm is used:

1) Prescribe the position and orientation of the platform PB, namely vector p and angle φ.
2) Compute the position of point B using (21).
3) Compute the first two joint coordinates ρ1 and ρ2 using (24).
4) Based on the position and orientation of the platform PB, compute the position of point S that will make link SB orthogonal to the platform PB. This is accomplished using (40), in which the solution that places link SB below the platform PB in the reference configuration is chosen:

$$s = p + Qv - \frac{\ell}{b}EQv = p + \left(1 - \frac{\ell}{b}E\right)Qv \quad (40)$$

where 1 stands for the identity matrix. This step corresponds to the redundancy resolution.

5) Compute the last two joint coordinates ρ3 and ρ4 using (28).

If only the positive solutions of ρi are considered and if the link SB and the platform PB are prescribed to be orthogonal, the inverse kinematic problem has only two solutions.

The above solution can be generalized to exploit the kinematic redundancy for the performance of an auxiliary task. Indeed, the angle between links SB and PB does not need to be kept at 90°: It suffices to ensure that this angle does not become close to zero or π. Therefore, there exists a range of angles within which the configuration of the link SB and platform PB can be chosen and an additional task can be associated with this choice of angle. For example, the use of the redundancy for grasping is considered, by providing gripper portions integral with the link SB, and integral with the platform PB, the gripper portions concurrently forming a gripper actuable by the selective displacement of the platform PB along at least one of three DOFs in the working plane of the mechanism 100, with the angle θ between platform PB and the link BS corresponding to the opening of such a gripper. The general inverse kinematic algorithm can be written as follows:

1) Prescribe the position and orientation of the platform PB, namely vector p and angle φ.
2) Compute the position of point B using (21).
3) Compute the first two joint coordinates ρ1 and ρ2 using (24).
4) Select the orientation of link SB—with respect to the platformPB—that corresponds to the auxiliary task while ensuring that links SB and PB do not become close to being aligned. This is accomplished using $$s = p - Qv - \frac{\ell}{b}RQv = p + \left(1 - \frac{\ell}{b}R\right)Qv \quad (41)$$

where 1 stands for the identity matrix, and matrix R is defined as $$R = \begin{bmatrix} \cos\theta & -\sin\theta \\ \sin\theta & \cos\theta \end{bmatrix} \quad (42)$$

where θ is the angle between the platform PB and the link BS. In order to avoid singularities, this angle should be restricted to one of the following ranges, namely $$-\pi-\gamma \leq \theta \leq -\gamma \text{ or } \gamma \leq \theta \leq \pi-\gamma \quad (43)$$

where Y is the angle that is considered safe for singularity avoidance. This step corresponds to the exploitation of the redundancy for a given additional task such as grasping.

5) Compute the last two joint coordinates $\rho 3$ and $\rho 4$ using (28).

The direct kinematic problem of the kinematically redundant mechanisms proposed herein is rather straightforward. Indeed, if the first two actuator coordinates, $\rho 1$ and $\rho 2$, are prescribed, it is possible to compute the position vector of point P. The latter problem corresponds to finding the intersection of two circles centered, respectively, in A1 and A2 and having radii $\rho 1$ and $\rho 2$. Similarly, if actuator coordinates $\rho 3$ and $\rho 4$ are prescribed, it is possible to compute the position vector of point S. This problem corresponds to finding the intersection of two circles centered, respectively, in A3 and A4 and having radii $\rho 3$ and $\rho 4$. Finally, when the position of points P and S are known, the position of point B can be found by intersecting two circles of radii l and b centered, respectively, in S and P. Therefore, the solution of the direct kinematic problem can admit up to eight solutions. However, in practice, the geometric design of the mechanism 100 may limit the number of solutions. For example, the limitations on the actuator lengths are usually such that actuators of the single legs $A_1P$ and $A_2P$ can never become aligned (likewise for actuators of the sub-legs of the double leg) and links PB and BS are kept away from an aligned configuration in the above inverse kinematic algorithms. Under these conditions, the solution of the direct kinematic problem becomes unique and is readily computed.

The analysis of the workspace of the redundant parallel mechanism 100 can be readily performed based on the particular solution of the inverse kinematic problem defined above. Indeed, the latter solution assumes that links PB and SB remain orthogonal in order to avoid singularities. Based on this assumption, a virtual platform PBS can be defined, and the workspace analysis can be conducted using techniques developed for nonredundant planar parallel mechanisms 100. As long as the legs in a given pair are not allowed to align—which is readily verified—the workspace obtained using this approach is free from singularities since it is obtained while preventing links PB and SB to align.

Figure 8:
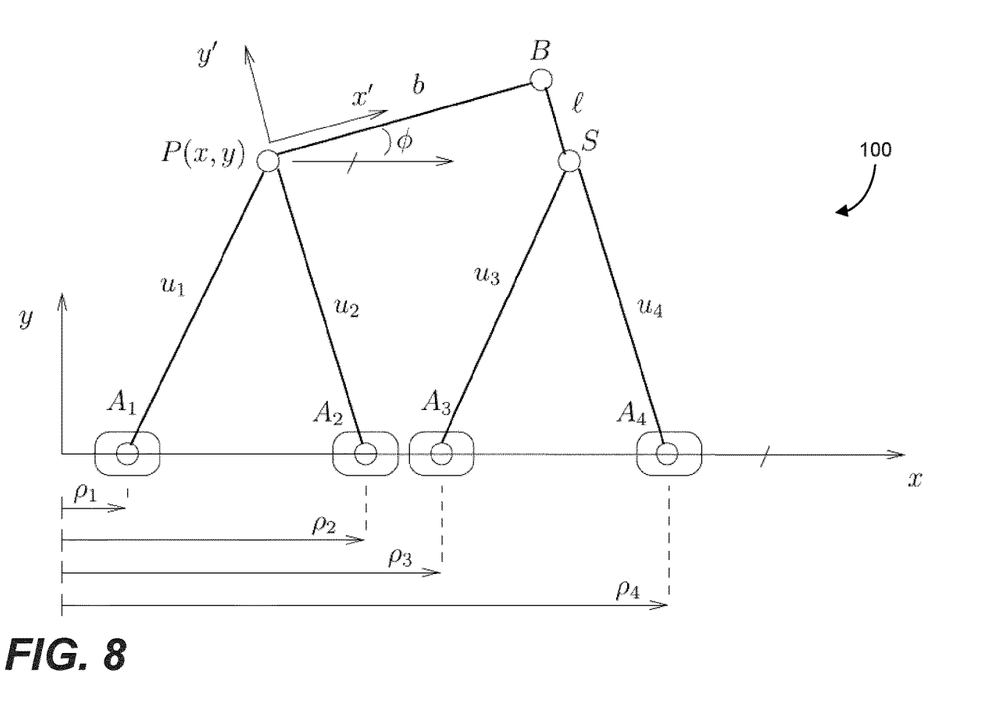
FIG. 8 is a schematic view of a planar parallel mechanism with kinematically redundant actuation by way of a double leg in accordance with an embodiment of the present disclosure, with PRR legs and sub-legs.

Referring now to FIG. 8, the kinematic analysis of mechanism 100 with legs and sub-legs of the PRR type is developed, as yet another alternative leg configuration (others may include RRR legs). The equations are very similar to the ones presented above for the configuration of mechanism 100 with RPR legs as in FIG. 7.

The mechanism 100 of FIG. 8 is based on a conventional 3-PRR parallel mechanism in which one of the legs is replaced with the double leg 14", in a planar version. A fixed reference frame Oxy is attached to the base, while a moving reference frame Px'y' is attached to the platform PB. The ith joint coordinate, noted $\rho i$, with $i=1, \ldots, 4$, is associated with the motion of the actuated prismatic joint on each of the legs. The position vector of the center of the first passive revolute joint, point $A_i$, can, therefore, be written as $$a_i = \rho_i e_i, \quad i=1 \ldots 4 \tag{44}$$

where $e_i$, is a constant unit vector oriented along the axis of the ith fixed prismatic joint. In the geometric arrangement of FIG. 8, the axes of all prismatic joints are aligned with the x-axis of the fixed coordinate frame, and therefore, one has $$e_i = [1 \ 0]^T, \quad i=1 \ldots 4. \tag{45}$$

The (constant) length of the link connecting point $A_i$, with $i=1, 2$, to point P is noted $u_i$, as shown in FIG. 8. One can then write $$(p-a_i)^T(p-a_i) = u_i^2, \quad i=1,2. \tag{46}$$

Substituting (44) into (46) and rearranging then leads to $$\rho_i^2 + B_i \rho_i + C_i = 0, \quad i=1,2 \tag{47}$$

where $$B_i = -2p^T e_i \text{ and } C_i = p^T p - u_i^2, \quad i=1,2. \tag{48}$$

In addition, differentiating (46) with respect to time leads to $$(p-a_i)^T \dot{p} - (p-a_i)^T \dot{a}_i = \dot{\rho}_i (p-a_i)^T e_i, \quad i=1,2. \tag{49}$$

Considering now the kinematics of the moving platform PB, (21), (22), (26), and (17) directly apply, leading to $$(s-b)^T \dot{s} = (s-b)^T (\dot{p} + \dot{\varphi} E Q v). \tag{50}$$

where $\varphi$ is the angle between the fixed x-axis and the moving x'-axis and represents the orientation of the platform, while E, Q, and v are defined, respectively, in (23), (19), and (20).

The sub-legs can then be considered. The (constant) length of the link connecting point $A_i$, with $i=3, 4$, to point S is noted $u_i$, as shown in FIG. 8. One can then write $$(s-a_i)^T(s-a_i) = u_i^2, \quad i=3,4. \tag{51}$$

The above equation can be rewritten as $$\rho_i^2 + D_i \rho_i - F_i = 0. \quad I=3,4 \tag{52}$$

where $$D_i = -2s^T e_i \text{ and } F_i = s^T s - u_i^2, \quad i=3,4 \tag{53}$$

Differentiating (51) with respect to time, one then gets $$(s-a_i)^T \dot{s} = (s-a_i)^T \dot{a}_i = \dot{\rho}_i (s-a_i)^T e_i, \quad i=3,4 \tag{54}$$

which can be written in matrix form as $$H\dot{s} = h_p \tag{55}$$

where H is defined in (31) and where hp is defined as $$h_p = \begin{bmatrix} (s-a_3)^T e_3 \dot{\rho}_3 \\ (s-a_4)^T e_4 \dot{\rho}_4 \end{bmatrix}. \tag{56}$$

As pointed out in the derivation of the kinematic equations of the mechanism with RPR legs, matrix H is of full rank as long as the sub-legs (links of length u3 and u4) are not aligned. Matrix H can be inverted explicitly, leading to the expression of matrix N given in (33), which also applies here. One has $$\dot{s} = N h_p. \tag{57}$$

Substituting (57) into (50) and rearranging, the third velocity equation—complementing the first two velocity equations given in (49)—is obtained as $$(s-b)^T(\dot{p} - \dot{\varphi} E Q v) = k_{p33} \dot{\rho}_3 + k_{p34} \dot{\rho}_4 \tag{58}$$

where $$k_{p33} = \mu[(s-b)^T E(s-a_4)(s-a_3)^T e_3] \tag{59}$$

$$k_{p34} = -\mu[(s-b)^T E(s-a_3)(s-a_4)^T e_4] \tag{60}$$

with $$\mu = \frac{1}{(s-a_3)^T E(s-a_4)}. \tag{61}$$

Based on the above derivation, the Jacobian matrices can be assembled, leading to $$J\dot{t} = K_p \dot{\rho} \tag{62}$$

where matrix J is defined in (36), vectors t and p are defined as $t=[p^T \varphi]^T$, and $\rho=[\rho 1\ \rho 2\ \rho 3\ \rho 4]^T$., and where matrix $K_\rho$ is defined as $$K_p = \begin{bmatrix} (p-a_1)^T e_1 & 0 & 0 & 0 \\ 0 & (p-a_2)^T e_2 & 0 & 0 \\ 0 & 0 & k_{p33} & k_{p34} \end{bmatrix} \quad (63)$$

with $k_p33$ and $k_p34$ as defined in (59) and (60). It is noted that matrix J is the same as in the case of the mechanism with RPR legs, while matrix K has to be modified to account for the different actuation scheme.

The use of legs of the PRR type in the mechanism 100 slightly changes the singularity avoidance conditions. Indeed, in the case of RPR legs, the two legs attached to a common platform (or intermediate link) joint could not become aligned as long as the sum of their minimum lengths is larger than the distance between their fixed attachment points. In the case of PRR legs, one must again ensure that two legs attached to a common platform (or intermediate link) joint do not become aligned, which would lead to a singularity. If the rails are all aligned, as in FIG. 8, this condition means that the travel ranges of two such links along the rails should not overlap and that the maximum distance between two rail points is smaller than twice the length of the legs. If the rails are not aligned, then it should be ensured that the rail segments do not intersect and that the maximum distance between two rail points is smaller than twice the length of the legs. Alternatively, if such design constraints cannot be met or are deemed too restrictive, the possible occurrence of leg alignments can be managed by proper trajectory planning.

The inverse kinematic problem of the mechanism with PRR legs can be solved as follows:
1) Prescribe the position and orientation of the platform PB, namely vector p and angle $\varphi$.
2) Compute the position of point B using (21).
3) Compute the first two joint coordinates $\rho 1$ and $\rho 2$ using (47). The latter quadratic equations are readily solved for pi and the proper root of the equation is easily determined based on the geometric arrangement.
4) Select the orientation of link SB—with respect to the platform PB—that corresponds to maintaining the links at 90° or to performing an auxiliary task, while ensuring that links SB and PB do not become close to being aligned. This is accomplished using $$s = p - Qv - \frac{\ell}{b} RQv = p + \left(1 - \frac{\ell}{b} R\right) Qv \quad (64)$$

where 1 stands for the identity matrix, and matrix R is defined as $$R = \begin{bmatrix} \cos\theta & -\sin\theta \\ \sin\theta & \cos\theta \end{bmatrix} \quad (65)$$

where $\theta$ is the angle between link PB and link BS, which is either set to −90° or restricted to one of the following ranges:

$$-\pi - \textcircled{0}_i \leq \theta \leq -\textcircled{0}_i \text{ or } \textcircled{0}_i \leq \theta \leq \pi - \textcircled{0}_i \quad (66)$$

where Y is the angle that is considered safe for singularity avoidance.

5) Compute the last two joint coordinates $\rho 3$ and $\rho 4$ using (52). The latter quadratic equations are readily solved for pi and the selection of the proper root is straightforward, based on the geometric arrangement of the legs.

The invention claimed is:

1. A leg with kinematically redundant actuation for a parallel mechanism comprising:
   a first sub-leg and a second sub-leg, each said sub-leg comprising a proximal end and a distal end;
   a link having a proximal end and a distal end, the link lying in a link plane;
   a revolute joint having a joint axis and being between and common to the distal ends of each of the first sub-leg and the second sub-leg, and the proximal end of the link, the joint axis projecting out of the link plane;
   at least one joint providing at least two rotational degrees of freedom (DOFs) at the distal end of the link and adapted to connect the distal end of the link to one end of the parallel mechanism, said at least one joint providing at least two rotational DOFs having a center lying in said link plane, said center being separated from the joint axis by a length;
   joints in the first sub-leg and the second sub-leg to provide DOFs to the sub-legs, with at least one of said joints in each of the first sub-leg and the second sub-leg connecting the proximal end of a respective one of the sub-legs to another end of the parallel mechanism; and
   at least one degree of actuation (DOA) for each of the first sub-leg and the second sub-leg to control movement of the link.

2. The leg according to claim 1, wherein said joints in the first sub-leg and the second sub-leg include:
   a translational DOF joint in each said sub-leg between its proximal end and its distal end, the DOA for each said sub-leg actuating the translational DOF joint, and at least one joint providing two rotational DOFs at the proximal end of each said sub-leg.

3. The leg according to claim 1, wherein said joints in the first sub-leg and the second sub-leg include:
   a rotational DOF joint in each said sub-leg between its proximal end and its distal end,
   a rotational DOF joint at the proximal end of each said sub-leg, the DOA for each said sub-leg actuating the rotational DOF joint at the proximal end, and
   a common rotational DOF joint connected to the other end of the parallel mechanism, the rotational DOF joints at the proximal ends of the sub-legs being concurrently mounted onto the common rotational DOF joint.

4. The leg according to claim 3, wherein the sub-legs lie in a plane and a rotational
   axis of the common rotational DOF joint lies in said plane.

5. The leg according to claim 1, wherein said joints in the first sub-leg and the second sub-leg include:
   a rotational DOF joint at the proximal end of each of the sub-legs,
   a translational DOF joint upon which is mounted said rotational DOF joint at the proximal end of each of the sub-legs, the DOA for each said sub-leg actuating the translational DOF joint, and
   a common rotational DOF joint connected to the other end of the parallel mechanism, the translational DOF joints at the proximal ends of the sub-legs being concurrently mounted onto the common rotational DOF joint.

6. The leg according to claim 1, wherein the link and the sub-legs lie in a common plane being said link plane, with an axis of rotation of the revolute joint between and common to the distal ends of the sub-legs being normal to the common plane.

7. A spatial parallel mechanism comprising:
a platform;
a base;
at least three of the legs with kinematically redundant actuation according to claim 1, each connected at opposed ends to the platform and to the base; and
at least three single legs extending between the one end and the other end of the spatial parallel mechanism, each single leg comprising
at least one distal joint providing at least two rotational DOFs connecting a distal end of the single leg to the spatial parallel mechanism,
joints to provide DOFs to the single leg with at least one of said joints in each of the single leg connecting a proximal end of the single leg to the spatial parallel mechanism, and
at least one DOA for each of the single leg to actuate movement at one of said joints;
wherein the DOAs of the legs with kinematically redundant actuation and of the single legs are actuated to selectively displace the platform along at least one of six DOFs.

8. The spatial parallel mechanism according to claim 7, wherein said joints in each said single leg include:
a translational DOF joint between the proximal end and the distal end of each said single leg, the DOA for each said single leg actuating the translational DOF joint, and
at least one proximal joint providing two rotational DOFs at the proximal end of each said single leg.

9. The spatial parallel mechanism according to claim 7, wherein the proximal end of the legs with kinematically redundant actuation and of the single legs are connected to the base, and the distal ends of the legs with kinematically redundant actuation and of the single legs are connected to the platform.

10. A leg with kinematically redundant actuation for a parallel mechanism comprising:
a first sub-leg and a second sub-leg, each said sub-leg comprising a proximal end and a distal end;
a link having a proximal end and a distal end, the link lying in a link plane;
a revolute joint having a joint axis and being between and common to the distal ends of each of the first sub-leg and the second sub-leg, and the proximal end of the link, the joint axis projecting out of the link plane;
at least one joint providing at least two rotational degrees of freedom (DOFs) at the distal end of the link and adapted to connect the distal end of the link to one end of the parallel mechanism, said at least one joint providing at least two rotational DOFs, the one joint having a center point lying in said link plane, said center point being separated from the joint axis by a length;
joints in the first sub-leg and the second sub-leg to provide DOFs to the sub-legs, with at least one of said joints in each of the first sub-leg and the second sub-leg connecting the proximal end of a respective one of the sub-legs to another end of the parallel mechanism; and
at least one degree of actuation (DOA) for each of the first sub-leg and the second sub-leg to control movement of the link.

11. The leg according to claim 10, wherein said joints in the first sub-leg and the second sub-leg include:
a translational DOF joint in each said sub-leg between its proximal end and its distal end, the DOA for each said sub-leg actuating the translational DOF joint, and
at least one joint providing two rotational DOFs at the proximal end of each said sub-leg.

\* \* \* \* \*